(12) United States Patent
Pelard et al.

(10) Patent No.: US 6,535,329 B1
(45) Date of Patent: Mar. 18, 2003

(54) TEMPERATURE TUNING AN OPTICAL AMPLIFIER

(75) Inventors: Cattalen Pelard, Freehold, NJ (US); Donald Zimmerman, Farmingdale, NJ (US); John R. Costelloe, Freehold, NJ (US); Paul Bollond, Tinton Falls, NJ (US)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 09/466,923

(22) Filed: Dec. 20, 1999

(51) Int. Cl.[7] ............................... H01S 3/00
(52) U.S. Cl. .................... 359/337; 359/341.1
(58) Field of Search ................. 359/337, 341.1, 359/337.1

(56) References Cited

U.S. PATENT DOCUMENTS

| | | | | |
|---|---|---|---|---|
| 6,049,414 A | * | 4/2000 | Espindola et al. | 359/337 |
| 6,104,526 A | * | 8/2000 | Kakui | 359/337 |
| 6,144,486 A | * | 11/2000 | Bennett et al. | 359/341 |
| 6,144,788 A | * | 11/2000 | Ang et al. | 385/31 |
| 6,320,693 B1 | * | 11/2001 | Cereo et al. | 359/337 |

FOREIGN PATENT DOCUMENTS

EP 1 111 743 A2 * 6/2001

OTHER PUBLICATIONS

"Temperature dependent behaviour of C–band and L–band EDFAs: A comparison" Flood, Electronics Letters, Jun. 10, 1999, vol. 35, No. 12.

"The gain equalizing methods of 1580nm–band Erbium doped fiber amplifier for wide temperature and wide input power ranges" Suzuki et al.

* cited by examiner

*Primary Examiner*—Mark Hellner
(74) *Attorney, Agent, or Firm*—Lacasse & Associates, LLC

(57) ABSTRACT

A method and system is disclosed of characterizing an optical amplifier for operation with a required tilt or curvature within predetermined limits. As the temperature of the erbium-doped optical amplifier is varied while a test signal is launched into the amplifier accompanied by a pump signal the output spectrum is compared with a desired spectrum. At different temperatures different measures of tilt or curvature are present at the output port of the amplifier in the presence of an input signal at the input port. Feedback related to the measure of tilt or curvature of at least one of the plurality of different temperatures is provided in the form of a feedback signal or an information signal.

10 Claims, 3 Drawing Sheets

TEMPERATURE TUNING AN OPTICAL AMPLIFIER

This invention relates to a variable gain tilt control system for use with an optical amplifier, and more particularly with a rare earth doped optical fiber amplifier.

BACKGROUND OF THE INVENTION

Optical amplifiers and particularly erbium doped optical fiber amplifiers are nearly ubiquitous in optical transmission systems, particularly in the field of telecommunications. Erbium doped fiber amplifiers (EDFAs) have high polarization insensitive gain, low cross talk between signals of different wavelengths, good saturation output power, and a noise figure close to the fundamental quantum limit. The excellent noise characteristics allow hundreds of these amplifiers to be cascaded to cover spans of thousands of kilometers of optical fibre. EDFAs as opposed to electronic repeaters are also transparent to data rate, signal format, and wavelength over a limited range, making them useful for wavelength multiplexed (WDM) communication systems that simultaneously transmit a large number of signals using different wavelength bands for each signal.

Notwithstanding these generally excellent characteristics, a disadvantage associated with EDFAs is their narrow spectral width and uneven gain band. The useful telecommunications window of an EDFA is approximately 20–30 nm wide, while an ideal amplifier would have a flat spectral gain across the full spectrum which extends from approximately 1520 nm to 1570 nm. The peak wavelength of the erbium gain spectrum varies from about 1530 nm to about 1535 nm depending upon the host glass material. FIG. 1 shows the characteristic gain spectrum of a particular conventional EDFA where it can be seen that the gain as a function of wavelength varies; this variation will be referred to hereinafter as gain ripple. Numerous techniques have been published for widening and flattening the gain spectrum (i.e. reducing the ripple) and include for example co-doping an erbium-doped silica glass fibre with $Al_2O_3$; changing the host glass material itself; using various forms of attenuating filters to reduce the gain at the emission peak; and, constructing hybrid devices having two or more different types of serially connected erbium doped fibre and actively adjusting pump conditions independently in each fibre section to compensate for the different gain slopes of each fibre.

In addition to the aforementioned problems and solutions associated with minimizing gain ripple, another significant problem exists to which there have been no simple, inexpensive, and practicable solutions. This other significant problem solved by this invention relates to improving dynamic gain tilt. The term dynamic gain tilt as used hereafter means the variation in gain at one wavelength as a result of changing the gain at any other wavelength via a change in input EDFA operating conditions. Although the techniques described above for minimizing gain ripple can provide a relatively flat spectrum in a specified wavelength band for a specific set of input optical powers and wavelength, the gain equalization performance degrades rapidly when the gain is changed (change in average population inversion levels) from the nominal conditions by changing the input power to the amplifier. One reported solution to this problem is allegedly achieved by a hybrid fibre device having cascaded amplifying stages with different gain spectra and an equal number of pump sources to allow the gain spectra of the individual stages to be effectively tuned independently so that when the total gain is changed, the relative contribution of each stage can be adjusted to arrive at the desired gain, with a resulting gain spectrum having a minimal amount of spectral distortion over the selected wavelength band. As an example, an erbium doped fibre having a positive gain slope may be combined with a different erbium doped fibre having a negative gain slope such that the hybrid device has a nearly flat gain at specific input power conditions. However, if the overall gain of the hybrid device must be changed, the gain slope of each of the constituent states will generally change at different rates when the pump power input to one of the stages is changed. In order to achieve good compensation at the new operating point, the relative gain of each of the constituent gain stages must be readjusted to make the gain slopes compensate each other. In implementing this type of amplifier, one skilled in the art would likely cascade two or more different erbium doped fibre compositions and provide a separate pump source for each amplifying stage at an end of each stage so as to minimize the number of splices and make it as convenient as possible to independently control the pump power to each stage. However, this technique for reducing or improving dynamic gain tilt requires a complex control scheme during operation in which the total power of multiple pump sources must be coordinated in order to realize gain slope compensation over a range of different gains (i.e. to change input power while maintaining a fixed target output power).

U.S. Pat. No. 5,764,406 in the name of Newhouse et at. entitled Hybrid Optical Amplifier Dynamic Gain Tilt incorporated herein by reference, describes a system wherein an erbium doped fibre amplifier device has a dynamic gain tilt that is less then the gain tilt of any of the constituent fibres. The hybrid device has at most one less pumping source than the number of constituent waveguides of the device. The hybrid device automatically provides a change in the pump distribution among the constituent doped waveguide sections so as to achieve a readjustment of the relative gains of the constituent sections. In one embodiment, this invention provides constituent EDFs of different co-dopant compositions that provides an automatic change in the pump distribution or partitioning among the constituent EDF sections so as to achieve a readjustment of the relative gains of the constituent EDF sections.

Although the '406 patent appears to achieve its intended function, it is a relatively costly and is a complicated solution to dynamically controlling gain tilt.

Most known solutions for correcting for dynamic gain tilt have an associated power loss (approximately 5 dB) and furthermore, increased power is required for extra pumping. Another deleterious result of these systems is an increased resulting noise.

In the L-band, gain flatness is known to be difficult to achieve for operation of an L-band optical amplifier when temperature and power varies. In a paper entitled "The gain equalizing method of 1580 nm-band Erbium doped fiber amplifier for wide temperature and wide input power ranges" Suzuki et al of the Oki Electric Industry Co., Ltd. discloses using automatic gain control (AGC) operation by adjusting the backward pumping power and controlling the input power by a variable attenuator. In a paper entitled "Temperature dependent behavior of C-band and L-band EDFAs: A comparison" F. A. Flood discloses that the temperature dependence of signal emission and absorption cross-sections have greater impact on the L-band output power. Furthermore, it is shown that the L-band temperature coefficient (dB/° C.) is comparatively less sensitive to pump wavelength. Thus, it is known that fluctuations in temperature of an erbium doped optical fibre amplifier degrade performance of the amplifier.

It has been discovered, that the tilt of an L-band optical amplifier can be controlled and varied by controlling and/or varying the temperature of the erbium-doped optical fibre within the amplifier. Heretofore, the convention has been to temperature compensate optical amplifiers to ambient so that variation in their operating temperatures did not occur, as a change in operating temperature was viewed as deleterious to the functioning of the device.

Now, in accordance with the discovery that tilt can be controlled and/or controllably varied to achieve a desired tilt, within predetermined limits, amplifiers can be pre-tested to characterize their tilt at and variation in their tilt for various applied temperatures.

Furthermore, dynamic tilt control can be provided by way of heating or cooling the EDF in an L-band optical amplifier by providing a feedback signal corresponding to the tilt of the output signal. In response to the feedback signal temperature of the erbium fibre can be varied dynamically to stabilize or vary the tilt as required.

It is an object of this invention to provide a novel controller and control method for use within rare-earth doped optical amplifiers that can be used to complement a filter that can be placed in-line within an optical amplifier for varying the gain tilt dynamically as the power of the input signal is varied, or that can be used without such a filter in an EDFA system for controlling gain-tilt or curvature of the output response of the amplifier.

It is another object of the invention is to provide an inexpensive controller and controlling method for use in controlling tilt gain of an optical amplifier.

SUMMARY OF THE INVENTION

In accordance with the invention there is provided, a plurality of optical amplifiers, each having a substantially same tilt in the presence of a same input optical signal, each of the plurality of optical amplifiers comprising a length of rare-earth doped optical fibre, and a temperature set point at which the rare-earth doped optical fibre is maintained, wherein each one of the plurality of optical amplifiers has a substantially different temperature set point selected for compensating a loss variation of components of each one of the plurality of optical amplifiers to maintain the substantially same tilt of the plurality of optical amplifiers.

In accordance with another aspect of the invention there is provided an optical amplifier kit comprising an optical amplifier for providing a predetermined tilt corresponding to a predetermined constant temperature having: a length of rare-earth doped optical fibre, a pump laser optically coupled thereto, at least one of a heater and a cooler coupled to the length of rare-earth doped optical fibre for maintaining the optical fibre at the predetermined constant temperature corresponding to the predetermined tilt of the optical amplifier, and, a temperature set point at which the amplifier is to be constantly maintained to obtain an output tilt corresponding to the predetermined tilt.

Further, in accordance with yet another aspect of the invention, there is provided a method of setting an optical amplifier for operation at a predetermined tilt or curvature comprising the steps of providing an L-band optical amplifier having a length of rare-earth doped optical fibre, determining a temperature set point of the optical amplifier for providing the predetermined tilt or curvature at a respective temperature, and constantly maintaining the optical amplifier at said temperature set point.

In accordance with the invention there is further provided, a method of operating an optical amplifier at a predetermined tilt or curvature comprising the steps of providing an optical amplifier having a length of rare-earth doped optical fibre, determining a temperature set point that corresponds to the predetermined tilt or curvature for compensating a loss variation of components of the optical amplifier, and constantly operating the optical amplifier at said temperature set point.

In accordance with the invention, a method of characterizing an optical amplifier for operation with a required tilt or curvature within predetermined limits is provided, comprising the steps of:

providing an optical amplifier having length of rare-earth doped optical fibre and having an input port and an output port;

varying the temperature of the rare-earth doped optical fibre to a plurality of different temperatures;

determining at the different temperatures different measures of tilt or curvature present at the output port of the amplifier in the presence of an input signal at the input port; and, providing feedback related to the measure of tilt at at least one of the plurality of different temperatures.

In accordance with the invention, there is provided, a plurality of optical amplifiers having a substantially same tilt in the presence of a same input optical signal and having a substantially different temperature set point at which the erbium optical fibre is maintained.

In accordance with an aspect of the invention, an optical amplifier kit is provided, comprising:

a) an optical amplifier for providing a tilt varying with temperature having:
   a length of rare-earth doped optical fibre;
   a pump laser optically coupled thereto;
   at least one of a heater and a cooler coupled to the rare-earth doped optical fibre for maintaining the optical fibre at a predetermined temperature corresponding to a predetermined tilt or curvature of the optical amplifier; and, b) a measure of the temperature at which the amplifier is to be maintained to obtain an output tilt corresponding to the predetermined tilt.

In accordance with another aspect of the invention, a method of controlling an optical amplifier is provided for operation with a required tilt or curvature within predetermined limits, comprising the steps of: providing an optical amplifier having length of rare-earth doped optical fibre and having an input port and an output port; and providing a feedback signal related to the measure of tilt or curvature while varying the temperature of the rare-earth doped optical fibre.

BRIEF DESCRIPTION OF THE DRAWINGS

Exemplary embodiments of the invention will now be described in conjunction with the drawings, in which.

DETAILED DESCRIPTION

Figure 1:
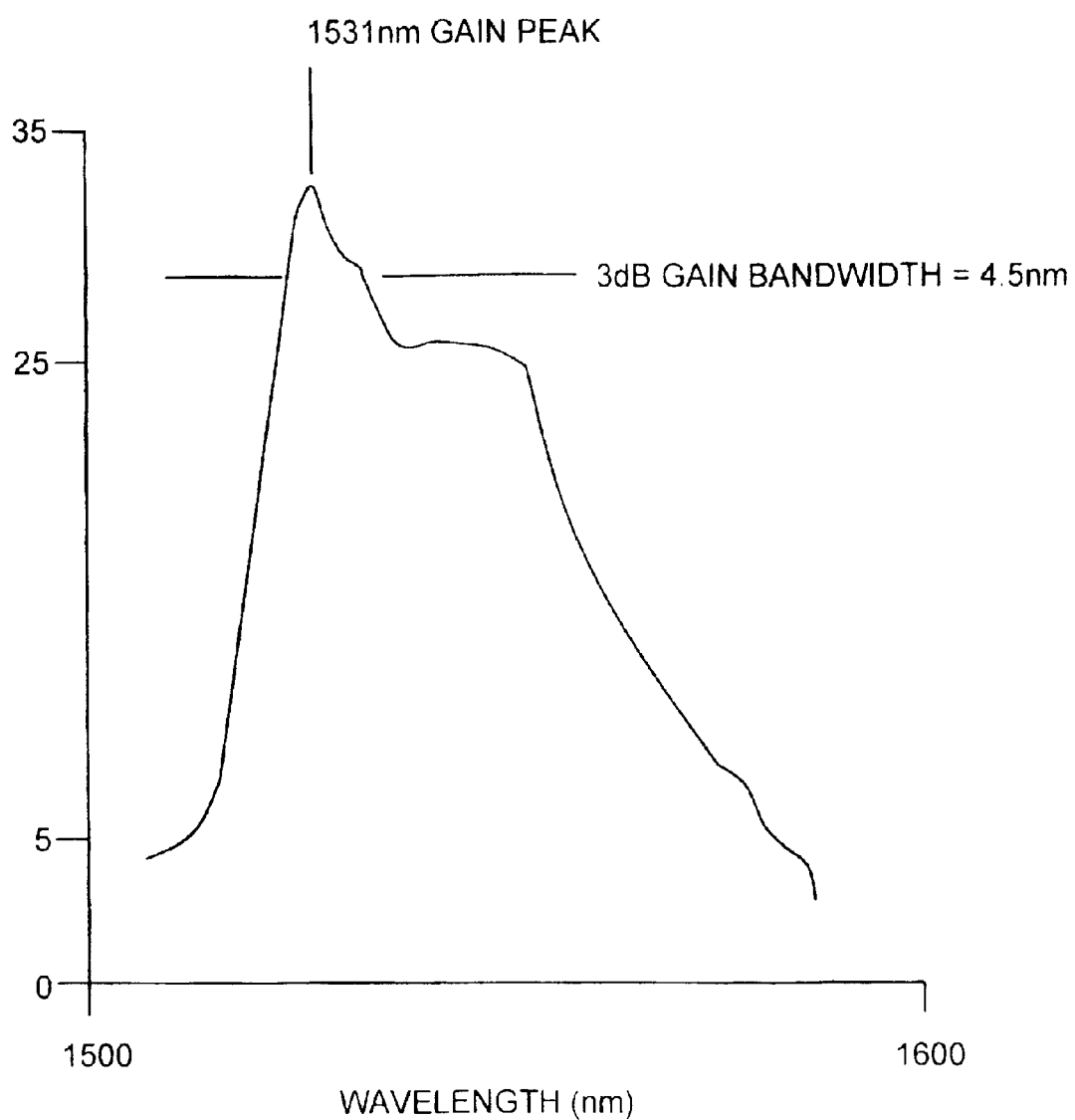
FIG. 1 is a graph of gain (dB) versus wavelength (nm) for a typical erbium doped amplifier.

Referring now to FIG. 1 the gain spectrum of a typical EDFA amplifier is shown wherein it can be seen that the gain as a function of wavelength varies.

For a wide variety of glass hosts, rare earth doped optical amplifiers and particularly EDFAs are effectively homogeneously broadened, and the overlap of dopant ions with the signal modes is nearly wavelength independent. As such, the gain spectrum, here being the small signal gain that would be measured by a weak probe signal while the operating point of the amplifier is fixed, is constrained to a single parameter family of wavelength dependencies. Therefore if gain of the amplifier at some reference wavelength is changed due to a change in input (i.e., pump and/or signal power) the amplifier gain at other wavelengths will change by well defined amounts that likely are to be different from the amount of gain change at the reference wavelength. The wavelength dependence of the amplifier gain change as of result of an input change is referred to herein as dynamic gain tilt. Hence, the dynamic gain tilt is a distortion of the amplifier gain spectrum for operating conditions that differ from the operating point for which the amplifier was designed.

As it was pointed out in the background of this invention, filters have been provided heretofore for offsetting and flattening the gain spectrum of conventional EDFAs. However providing such a fixed filter does not provide a solution to controlling distortion due to dynamic gain tilt a condition that varies with input power of the input optical signal.

Furthermore, filters cannot provide gain but can only attenuate a signal that is to be amplified; and, coupling losses associated with providing a filter optically coupled to the optical amplifier is viewed as detriment to the overall performance of the amplifier. This is not seen as a preferred solution.

Figure 2A:
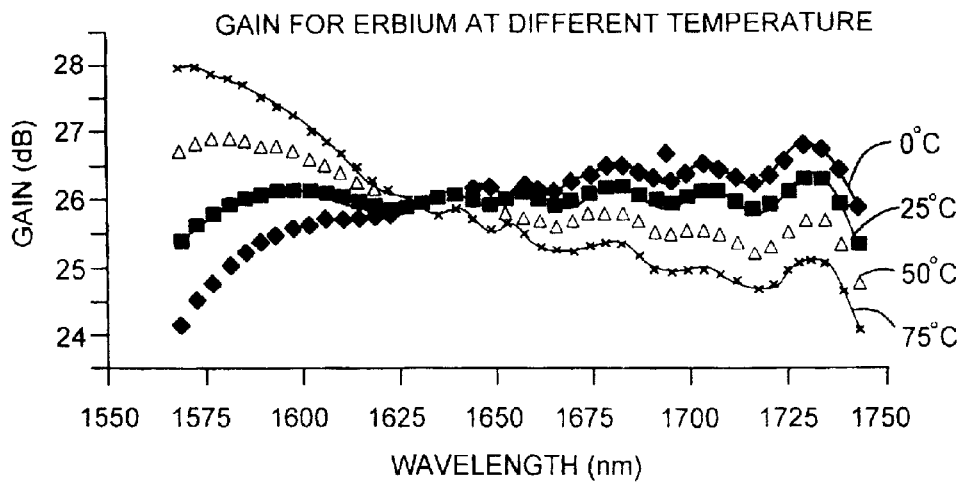
FIG. 2a is a graph of gain versus wavelength illustrating the gain shape for different temperatures of erbium-doped fibre in the L-band.
Figure 2B:
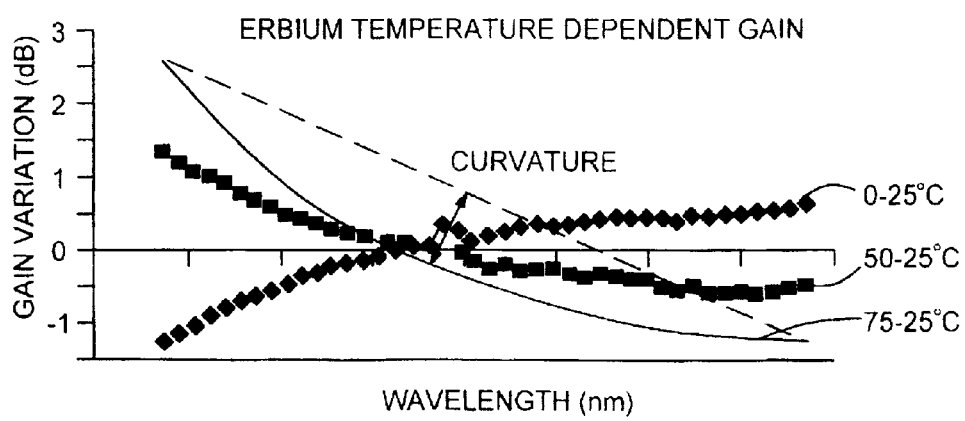
FIG. 2b is a graph that illustrates the tilt and curvature of the gain as temperature is varied between 0–25° C., 50–75° C., and 75–25° C.
Figure 2C:
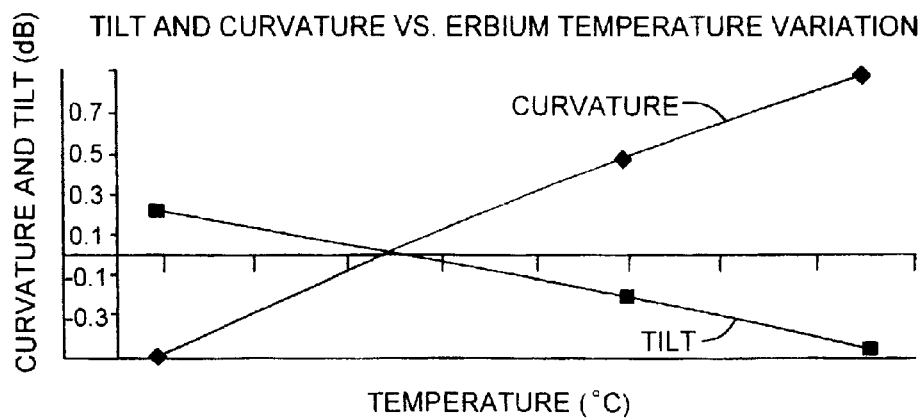
FIG. 2c is a graph illustrating how variation in temperature can be used to optimize tilt and gain flatness.

Referring now to FIG. 2a a graph of gain versus wavelength for different temperatures is shown illustrating the variation in overall gain shape for the L-band wavelength range as the temperature of erbium doped fibre in an optical amplifier is varied between 0°C. and 75° C. FIG. 2b illustrates the tilt and curvature of the gain as temperature is varied between 0–25° C., 50–75° C., and 75–25° C. Thus the plots represent curves depicting 0° C. minus value at 25° C.; 50° C. minus the value at 75° C., and 75° C minus the value at 25° C. curve at 25° C. has been taken as a reference. This graph also-illustrates the degree to which curvature can be changed by appropriately varying the temperature. This is more evident when referring to FIG. 2c which indicates curvature and tilt as a function of temperature variation of the erbium-doped fibre. The results that were measured reveal that tilt varies with temperature by –0.075 dB/° C.; curvature varies by 0.0175 dB/° C. Since the variation shown in FIG. 2c is very linear, temperature can be used to optimize tilt and gain flatness.

Figure 3:
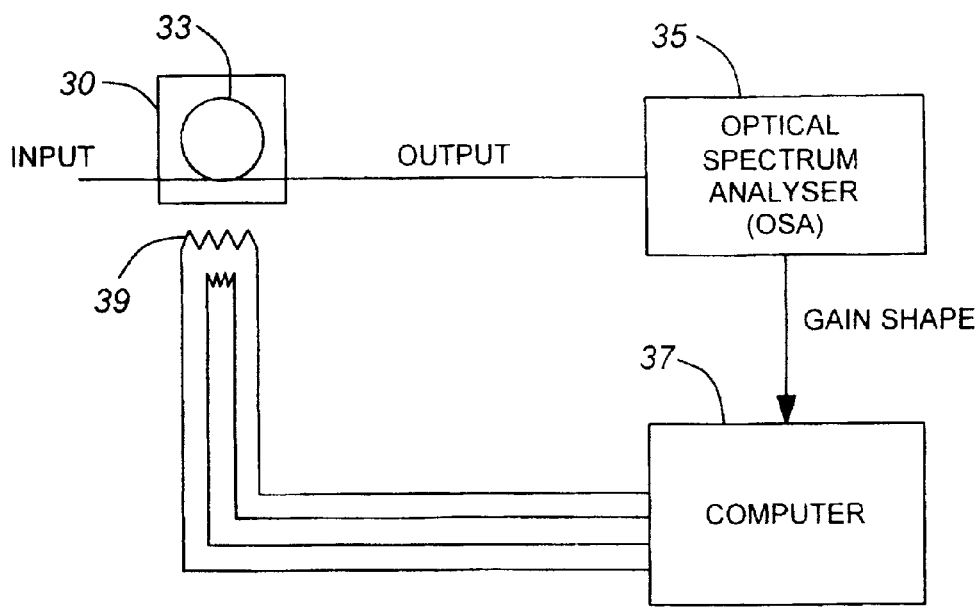
FIG. 3 is a circuit block diagram illustrating an optical circuit in accordance with this invention for measuring and determining an ideal temperature for operating an erbium doped optical fibre with a desired gain shape; and, FIG. 4 is a flow chart illustrating the steps required to provide an amplified ouptut signal having a desired spectrum.

Turning now to FIG. 3 a circuit is shown having a length of amplifying erbium-doped optical fibre 33 housed within a package containing a heater 30. An end of the L-band EDF 33 is optically coupled with an optical spectrum analyser (OSA) 35 which is coupled to a suitably programmed processor, i.e. in the form of a computer. The pump signal, not shown, is coupled in with the test signal. The OSA 35 provides a signal representative of the gain shape of a detected signal from the EDF 33 to the computer 37 for analysis. The computer 37 subsequently provides control signals that control the heater 39 in dependence upon the analysis of the information provided by the OSA.35. A thermistor provides feedback to the computer 37 from the region about the EDF 33.

Figure 4:
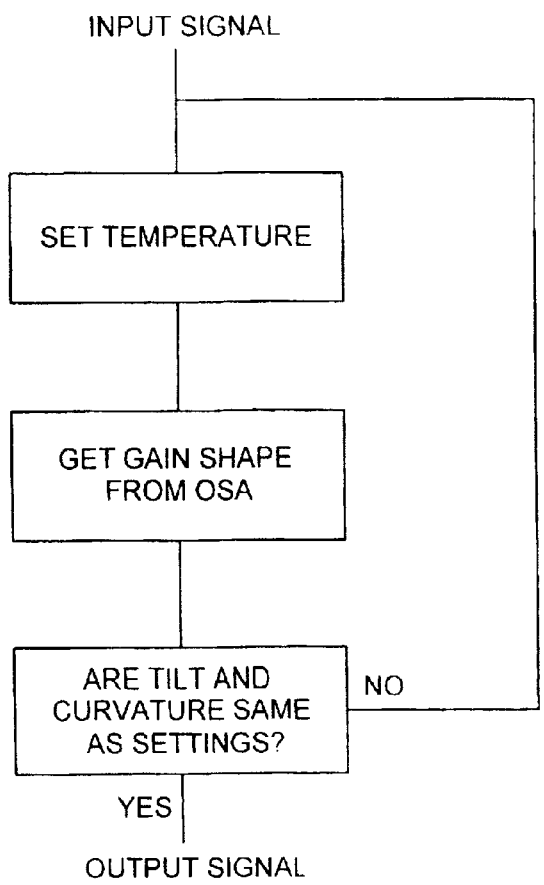

The flow chart of FIG. 4 illustrates a control loop executed by the computer 37. The sequence of steps is as follows: An input signal is launched into the input end of the EDF 33. The input signal must be, of a predetermined magnitude and must include a group of wavelengths of interest to be measured by the OSA 35. The temperature is set initially at an arbitrary value that is likely to be within a useful range of values. The OSA 35 receives the gain shape and subsequently passes the gain shape or information corresponding to the gain shape to the computer 37. The computer performs analysis on the received gain shape and compares the gain shape with spectra in the form of values stored on a memory storage device associated with the computer 37. When the gain shape (tilt and/or curvature) does not conform within predetermined limits to the stored values, the loop is re-executed and the temperature is increased or decreased as required. This is repeated until the OSA 35 provides values that are similar enough within predetermined limits to the values stored within the computer's memory; at which point, the temperature value or set point is recorded. Subsequently, a kit including an ideal temperature value related to tilt or curvature can be provided with the EDFA to a customer so that the amplifier can be used at the ideal temperature, ensuring that it's performance will meet certain desired output characteristics that were stored within the computer 37. Of course, each amplifier will likely have a different ideal operating temperature. Hence when a plurality of amplifiers are manufactured and tested in this manner, a plurality of different ideal operating temperatures will be provided with the amplifiers so that each can be set to its ideal operating temperature; this is in contrast with the prior art wherein a single operating temperature is selected as a set point for operating a large group of optical amplifiers. Providing an ideal operating temperature customized to each amplifier is highly beneficial with regard to achieving optimum performance from each amplifier.

Alternatively, a dynamic temperature tilt control system can be provided wherein a processor receives values from a detection circuit from one or a plurality of optical amplifiers; subsequently heaters or coolers on one or the plurality of amplifiers can be controlled by the processor to vary the tilt or curvature dynamically. Essentially a similar circuit to that shown in FIG. 3 is provided, however the OSA is connected to a tap which analyzes an output signal that has only a small percentage of the output power provided by the amplifier. Notwithstanding the tap signal can provide valuable spectral information about the shape of the amplified signal.

Advantageously, an EDFA can be calibrated during or subsequent to manufacture in order to determine an ideal temperature set point for operating the amplifier; and, or, the EDFA can be used by providing a circuit for dynamically monitoring the gain and for varying the temperature in dependence upon detected spectral characteristics at an output or tap output thereof.

By suitably controlling the temperature of the EDFA, curvature and/or tilt can be varied.

We claim:

1. A plurality of optical amplifiers, each having a substantially same tilt in the presence of a same input optical signal, each of the plurality of optical amplifiers comprising:
   a length of rare-earth doped optical fibre; and
   a temperature set point at which the rare-earth doped optical fibre is maintained, wherein each one of the plurality of optical amplifiers has a substantially different temperature set point selected for compensating a loss variation of components of each one of the plurality of optical amplifiers to maintain the substantially same tilt of the plurality of optical amplifiers.

2. An optical amplifier kit comprising:
   a) an optical amplifier for providing a predetermined tilt corresponding to a predetermined constant temperature having:
      a length of rare-earth doped optical fibre;
      a pump laser optically coupled thereto;
      at least one of a heater and a cooler coupled to the length of rare-earth doped optical fibre for maintaining the optical fibre at the predetermined constant temperature corresponding to the predetermined tilt of the optical amplifier; and,
   b) a temperature set point at which the amplifier is to be constantly maintained to obtain an output tilt corresponding to the predetermined tilt.

3. An optical amplifier kit as defined in claim 2 wherein the optical amplifier is an L-band amplifier.

4. An optical amplifier kit as defined in claim 2, wherein the rare-earth doped optical fibre is disposed within a container having the at least one heater or cooler.

5. An optical amplifier kit as defined in claim 4, wherein the pump laser includes a separate temperature control circuit.

6. A method of setting an optical amplifier for operation at a predetermined tilt or curvature comprising the steps of:
   providing an L-band optical amplifier having a length of rare-earth doped optical fibre;
   determining a temperature set point of the optical amplifier for providing the predetermined tilt or curvature at a respective temperature; and
   constantly maintaining the optical amplifier at said temperature set point.

7. The method as defined in claim 6 wherein the predetermined tilt or curvature is substantially zero.

8. A method of operating an optical amplifier at a predetermined tilt or curvature comprising the steps of:
   providing an optical amplifier having a length of rare-earth doped optical fibre;
   determining a temperature set point that corresponds to the predetermined tilt, or curvature for compensating a loss variation of components of the optical amplifier; and
   constantly operating the optical amplifier at said temperature set point.

9. The method as defined in claim 8 wherein a signal passing through the optical amplifier is an L-band signal having a wavelength in the range of approximately 1560 to 1620 nm.

10. The method as defined in claim 9 wherein the predetermined tilt or curvature is substantially zero.

* * * * *